Patented Aug. 8, 1933

1,921,458

UNITED STATES PATENT OFFICE 1,921,458

MANUFACTURE OF BASIC DERIVATIVES OF ANTHRAQUINONE

George Holland Ellis and Henry Charles Olpin, Spondon, near Derby, England, assignors to Celanese Corporation of America, a Corporation of Delaware No Drawing. Application April 19, 1929, Serial No. 356,596, and in Great Britain April 30, 1928

10 Claims. (Cl. 260—59)

This invention relates to the manufacture of basic anthraquinone derivatives by the replacement by amino or substituted amino groups of hydroxy groups in hydroxy anthraquinones, for example, quinizarin, 1:4:5-trihydroxyanthraquinone, 1:4:5:8-tetrahydroxy anthraquinone, alizarin bordeaux, 1:4-amino-hydroxy anthraquinone, diamino-anthraufin or diaminochrysazin.

We have found that basic anthraquinone derivatives can advantageously be produced by condensing reduction products of hydroxy anthraquinones with ammonia or an amine and oxidizing the resulting reduction products of amino-anthraquinones in the same liquor (that is without isolation) by means of an aromatic nitro compound.

The reduction products of hydroxy anthraquinones used according to the invention may be the leuco hydroxy anthraquinones or the anthranols corresponding thereto.

The aromatic nitro compounds may be of any desired series, for example, nitro compounds of the benzene series such as nitrobenzene and its homologues e. g. nitrotoluene.

The aromatic nitro compound may, for example, be added to the mixture of reduced hydroxy anthraquinone and ammonia or amine, whereby oxidation is effected simultaneously with the condensation, or it may be added subsequently to the condensation and the mixture heated to effect oxidation. The reaction may be carried out in presence of a solvent or diluent, for example, an organic solvent such as methylated spirit.

It is not necessary to start with the isolated reduction products of the hydroxy anthraquinones since the reduction of the hydroxy anthraquinones may be effected simultaneously with or in the same liquor as the condensation with ammonia or an amine.

It will be seen that by this process basic anthraquinone derivatives can be produced from the hydroxy anthraquinones or their reduction products in one operation without isolation of any intermediate product.

In the following example, which illustrates the process of the invention but does not in any way limit it, the parts are by weight.

Example 200 parts of leuco quinizarin are added to 1500 parts of methylated spirit and 200 parts of a 40 per cent solution of monomethylamine, and the whole is boiled under a reflux condenser for half an hour; 50 parts of nitrobenzene are then added and the solution boiled for a further half hour. On cooling 1:4-dimethyldiaminoanthraquinone in an excellent state of purity separates out in good yield.

In analogous manner there may be prepared 1:4-diaminoanthraquinone from leuco quinizarin and ammonia, 1:4-dimethyldiamino-5-hydroxy anthraquinone from leuco 1:4:5-trihydroxy anthraquinone and monomethylamine, 1:4-dimethyldiamino-5:8-dihydroxy anthraquinone from leuco 1:4:5:8-tetrahydroxy anthraquinone and monomethylamine, and 1:4-dimethyldiamino-5-hydroxy-8-aminoanthraquinone from leuco diamino-anthrarufin or leuco diaminochrysazin. By replacing the monomethylamine by other lower alkylamines e. g. ethylamine and aminoethyl alcohol or by other alkylamines or by arylamines such as aniline, the corresponding dialkyldiamino and diarylamino-derivatives are obtained while with ammonia unsubstituted amino derivatives result. In some cases, particularly when working with ammonia, it is advantageous to carry out the condensation at high temperatures in an autoclave.

What we claim and desire to secure by Letters Patent is:—

1. Process for the manufacture of basic derivatives of anthraquinone, comprising amidating reduction products of hydroxy anthraquinones and oxidizing the amidated products by means of an aromatic nitro compound in the amidating liquor at a temperature not substantially exceeding the boiling point of alcohol.

2. Process for the manufacture of basic derivatives of anthraquinone, comprising amidating leuco hydroxy anthraquinones and oxidizing the amidated products by means of an aromatic nitro compound in the amidating liquor at a temperature not substantially exceeding the boiling point of aqueous alcohol.

3. Process for the manufacture of basic derivatives of anthraquinone comprising amidating leuco hydroxy anthraquinones and oxidizing the amidated products by means of a nitro compound of the benzene series in the amidating liquor at a temperature not substantially exceeding the boiling point of aqueous alcohol.

4. Process for the manufacture of basic derivatives of anthraquinone comprising amidating leuco hydroxy anthraquinones and subsequently oxidizing the amidated products by means of an aromatic nitro compound in the amidating liquor at a temperature not substantially exceeding the boiling point of aqueous alcohol.

5. Process for the manufacture of basic derivatives of anthraquinone, comprising amidating hydroxy anthraquinones in the presence of aqueous alcohol and subsequently oxidizing the amidated products by boiling the amidation mixture containing the aqueous alcohol with an aromatic nitro compound.

6. Process for the manufacture of basic derivatives of anthraquinone comprising amidating leuco quinizarin and oxidizing the amidated products by means of an aromatic nitro compound in the amidating liquor, at a temperature not substantially exceeding the boiling point of aqueous alcohol.

7. Process for the manufacture of lower alkyl derivatives of 1: 4-diaminoanthraquinone comprising amidating leuco quinizarin with lower alkylamines in aqueous alcohol and oxidizing the amidated products by means of an aromatic nitro compound in the amidating liquor at a temperature not substantially exceeding the boiling point of aqueous alcohol.

8. Process for the manufacture of basic derivatives of anthraquinone, comprising amidating leuco hydroxy anthraquinones and oxidizing the amidated products by means of an aromatic nitro compound present during the amidation process at a temperature not substantially exceeding the boiling point of aqueous alcohol.

9. Process for the manufacture of basic derivatives of anthraquinone, comprising amidating leuco quinizarin and oxidizing the amidated products by means of an aromatic nitro compound present during the amidation process at a temperature not substantially exceeding the boiling point of aqueous alcohol.

10. Process for the manufacture of lower alkyl derivatives of 1: 4-diaminoanthraquinone, comprising amidating leuco quinizarin with lower alkylamines in the presence of aqueous alcohol and an aromatic nitro compound at a temperature not substantially exceeding the boiling point of aqueous alcohol.

GEORGE HOLLAND ELLIS.
HENRY CHARLES OLPIN.